(12) United States Patent
Iguchi

(10) Patent No.: US 7,542,179 B2
(45) Date of Patent: Jun. 2, 2009

(54) IMAGE READING METHOD, IMAGE READING APPARATUS, AND IMAGE FORMING APPARATUS

(75) Inventor: Yukinobu Iguchi, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 989 days.

(21) Appl. No.: 10/844,381

(22) Filed: May 13, 2004

(65) Prior Publication Data

US 2005/0002072 A1 Jan. 6, 2005

(30) Foreign Application Priority Data

May 14, 2003 (JP) ............................. 2003-136460

(51) Int. Cl.
*H04N 1/04* (2006.01)

(52) U.S. Cl. .................... 358/474; 358/486; 358/497

(58) Field of Classification Search ................ 358/400, 358/448, 475, 480, 486, 488, 493, 494, 497, 358/498
See application file for complete search history.

(56) References Cited

U.S. PATENT DOCUMENTS

| 4,952,972 | A * | 8/1990 | Someya .................... 355/68 |
| 7,050,657 | B2 * | 5/2006 | Yushiya et al. .............. 382/312 |
| 2002/0057469 | A1 * | 5/2002 | Yushiya et al. .............. 358/509 |
| 2003/0048491 | A1 * | 3/2003 | Fukuzawa .................. 358/474 |
| 2007/0102622 | A1 * | 5/2007 | Olsen et al. .............. 250/208.1 |

FOREIGN PATENT DOCUMENTS

JP 03-295356 A 12/1991

\* cited by examiner

*Primary Examiner*—Jerome Grant, II
(74) *Attorney, Agent, or Firm*—Buchanan Ingersoll & Rooney PC (57) ABSTRACT

An image reading apparatus for reading an image of a document in a selected one of a first mode and a second mode includes: a light source adapted to illuminate a surface of the document; a CCD sensor adapted to receive light reflected from the document surface; and a light intensity controller adapted to control the light source to emit light at a different intensity between the first and second modes.

13 Claims, 9 Drawing Sheets

| MONOCHROME/ COLOR | MIRROR-MOVING/ SHEET-THROUGH | DOCUMENT SURFACE ILLUMINANCE [Lx] | SUB-SCANNING SPEED [mm/sec] |
|---|---|---|---|
| MONOCHROME | MIRROR-MOVING | 20,000 | 150 |
| MONOCHROME | SHEET-THROUGH | 20,000 | 150 |
| COLOR | MIRROR-MOVING | 30,000 | 50 |
| COLOR | SHEET-THROUGH | 18,000 | 30 |

IMAGE READING METHOD, IMAGE READING APPARATUS, AND IMAGE FORMING APPARATUS

This application is based on an application No. 2003-136460 filed in Japan, the contents of which are hereby incorporated by reference.

BACKGROUND OF THE INVENTION (1) Field of the Invention

The present invention generally relates to image reading technology, and more particularly to technology for reading a document image in a selected one of a plurality of different modes.

(2) Description of the Related Art

Conventionally, copiers capable of two different reading operations are commercially available for office use, for example. One of the modes is to read a document to obtain a color image and the other to obtain a monochrome image. Such copiers generally include a halogen lamp or a fluorescent lamp as a light source for illuminating a document surface. Light reflected from the document surface is received with a CCD sensor, thereby reading an image of the document. The CCD sensor may be a 4-line CCD sensor that is composed of a 1-line CCD sensor dedicated exclusively for monochrome reading (hereinafter, referred to as the "monochrome CCD sensor") and a 3-line CCD sensor dedicated exclusively for color reading in RGB components (hereinafter referred to as the "color CCD sensor"). Monochrome reading of a document image is carried out with the monochrome CCD sensor, whereas color reading is carried out with the color CCD sensor.

It should be noted, however, color CCD sensors are generally lower in sensitivity than monochrome CCD sensors, and thus the S/N (Signal-to-Noise) ratio of color CCD sensors is lower than that that of monochrome CCD sensors. This leads to a problem that images obtained by color reading and monochrome reading are not equal in terms of image quality.

SUMMARY OF THE INVENTION

In view of the above problem, a first object of the present invention is to provide an image reading method for reading a document in different reading modes at the substantially same S/N ratio, thereby obtaining images of equal quality.

A second object of the present invention is to provide an image reading apparatus for reading a document in different reading modes at the substantially same S/N ratio, thereby obtaining images of equal quality.

A third object of the present invention is to provide an image forming apparatus having an image reading apparatus as above.

The first object stated above is achieved by an image reading method for reading a document to obtain an image thereof by illuminating the document with a light source to receive light reflected from the document, comprising: a reading mode selecting step of selecting a mode of reading the document from a first mode and a second mode; and a reading step of reading the document by causing the light source to emit light at a first intensity when the first mode is selected and at a second intensity when the second mode is selected.

The second object stated above is achieved by an image reading apparatus for reading an image of a document in a selected one of a first mode and a second mode, comprising: a light source adapted to illuminate a surface of the document; a CCD sensor adapted to receive light reflected from the document surface; and a light intensity controller adapted to control the light source to emit light at a different intensity between the first and second modes.

The third object stated above is achieved by an image forming apparatus comprising: an image reader adapted to read an image of a document; and a printer adapted to print the read document on a recording sheet, wherein the image reader includes: a light source adapted to illuminate a surface of the document; a CCD sensor adapted to receive light reflected from the document surface; and a light intensity controller adapted to control the light source to emit light at a different intensity between the first and second modes.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 4 is a view illustrating an operation panel that the copier is provided with;

DESCRIPTION OF THE PREFERRED EMBODIMENT

Hereinafter, description is given to an embodiment of an image reading apparatus according to the present invention, by way of an example of an image reader unit included in a digital color copier.

Figure 1:
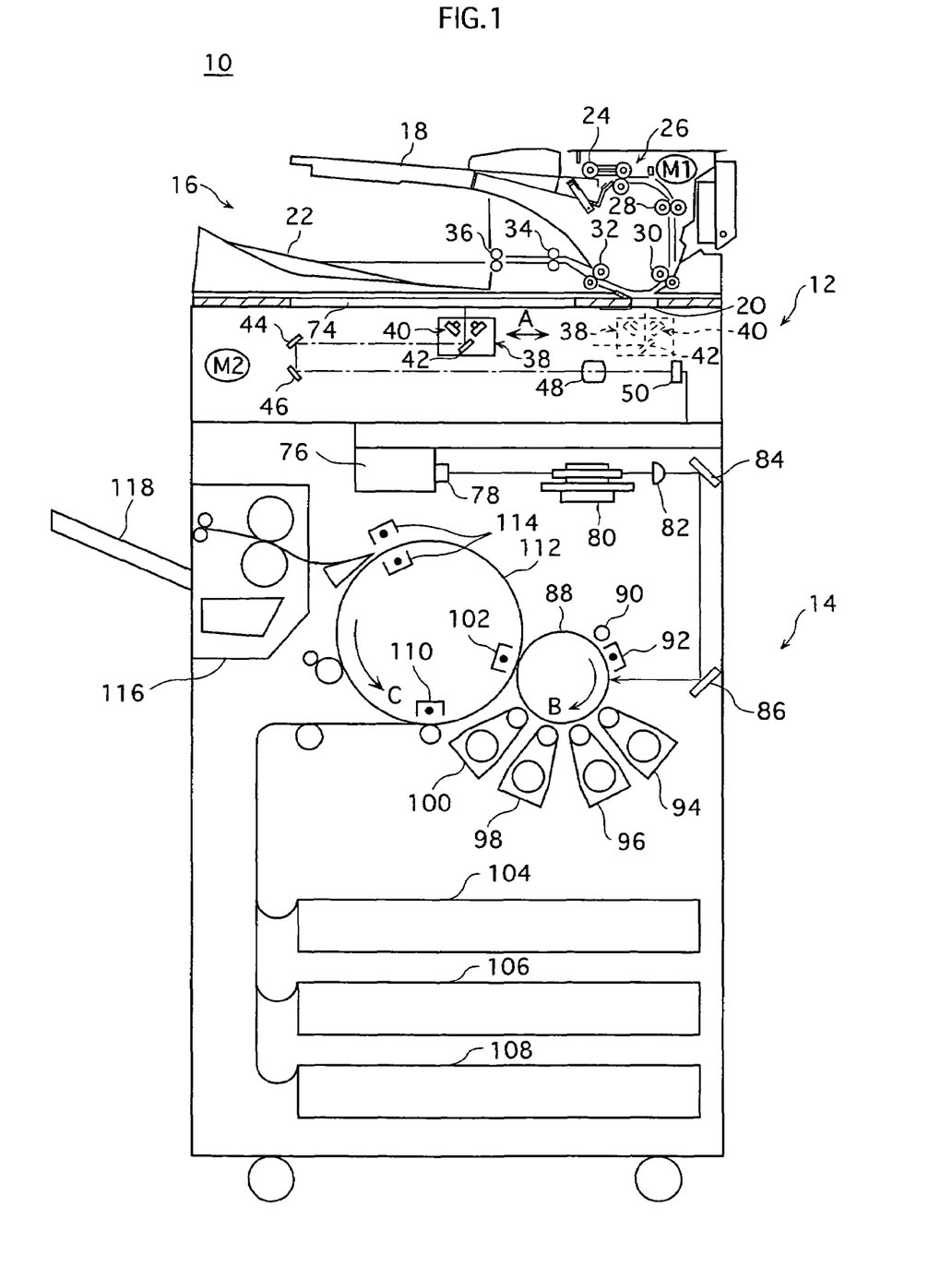
FIG. 1 is a schematic view illustrating a structure of a digital color copier.

FIG. 1 is a schematic view illustrating a structure of a digital color copier (hereinafter, referred to simply as the "copier") 10.

The copier 10 is composed roughly of an image reader unit 12 for reading a document image, and a printer unit 14 for reproducing the read image by printing the image on a recording sheet.

The image reader unit 12 is capable of reading a document image in sheet-through scheme, which falls in a category of fixed optical systems, as well as in a mirror-moving scheme, which falls in a category of moving optical systems. To be more specific, the sheet-through scheme is to read an image of a document by feeding the document past the optical system that stays (is fixed) in place. On the other hand, the mirror-moving scheme is to read an image of a document that is stationary placed, by moving mirrors relatively to the document to direct light reflected from a document surface to the CCD sensor. Here, the length of the optical path from the reading position of the document to the CCD sensor is kept constant at all times.

The image reader unit 12 is provided with an auto-document feeder 16 used in the sheet-through scheme.

The auto-document feeder 16 takes up documents stacked on a document feed tray 18 one by one. The document is then fed past an upper surface of a sheet-through platen glass 20 (i.e. the reading position), and then ejected onto a document output tray 22.

To be more specific, a document on the top of the stack on the document feed tray 18 is separated by take-up rollers 24 and separator rollers 26, and transported by first intermediate rollers 28 to registration rollers 30 where skew of the document is corrected. After the skew correction, the document is transported by the registration rollers 30 past the platen glass 20, and further transported by second intermediate rollers 32 as well as by third intermediate rollers 34 to ejecting rollers 36. Finally, the ejecting rollers 36 eject the document onto the document output tray 22. The rollers stated above are driven by a document motor M1 via a non-illustrated power transmission mechanism. The transport speed of document is adjustable by changing the rotation speed of the document motor M1. The document feed tray 18 is provided with a document detecting sensor 19 (not shown in FIG. 1 but in FIG. 6). The document detecting sensor 19 is composed of a light-emitting element and a photoreceptor, such as an LED and a photo electric sensor, respectively. The light-emitting element emits light for document detection, and the photoreceptor receives light reflected from a surface of a document placed on the document feed tray 18, whereby presence of the document is detected.

When passing over the platen glass 20, the document is exposed to light emitted from a white light source 40 included in a scanner 38 that stays in place below the platen glass 20. Light reflected from the document is changed its optical path by a first mirror 42, a second mirror 44, and a third mirror 46 to be directed to a collective lens 48, whereby the light comes into a focus on a CCD sensor 50.

Figure 2A:
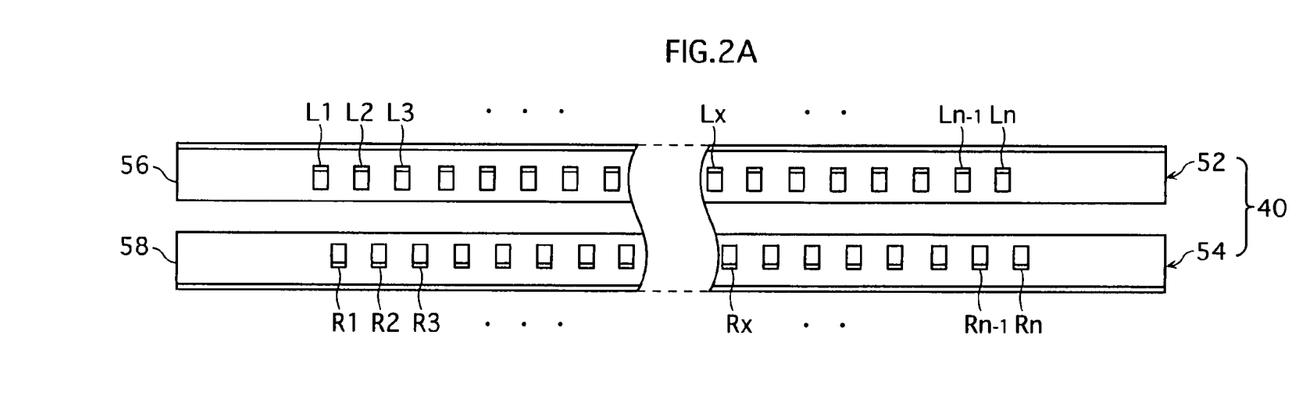
FIG. 2A is a schematic view illustrating LED arrays included in the copier, seen from above (from a document side)

As shown in FIG. 2A, the white light source 40 is composed of two white LED arrays (hereinafter, referred to simply as "LED arrays") 52 and 54. FIG. 2A is a schematic view illustrating the LED arrays 52 and 54 seen from above (from the document side).

The LED array 52 includes a positive integer n number of white LEDs L1, L2, . . . Ln-1, and Ln that are aligned at equally spaced intervals (3 mm, for example). Similarly, the LED array 54 includes n number of white LEDs R1, R2, . . . Rn-1, and Rn that are aligned at equally spaced intervals.

The LED arrays 52 and 54 are both aligned perpendicularly to the document transport direction (main scanning direction).

Figure 2B:
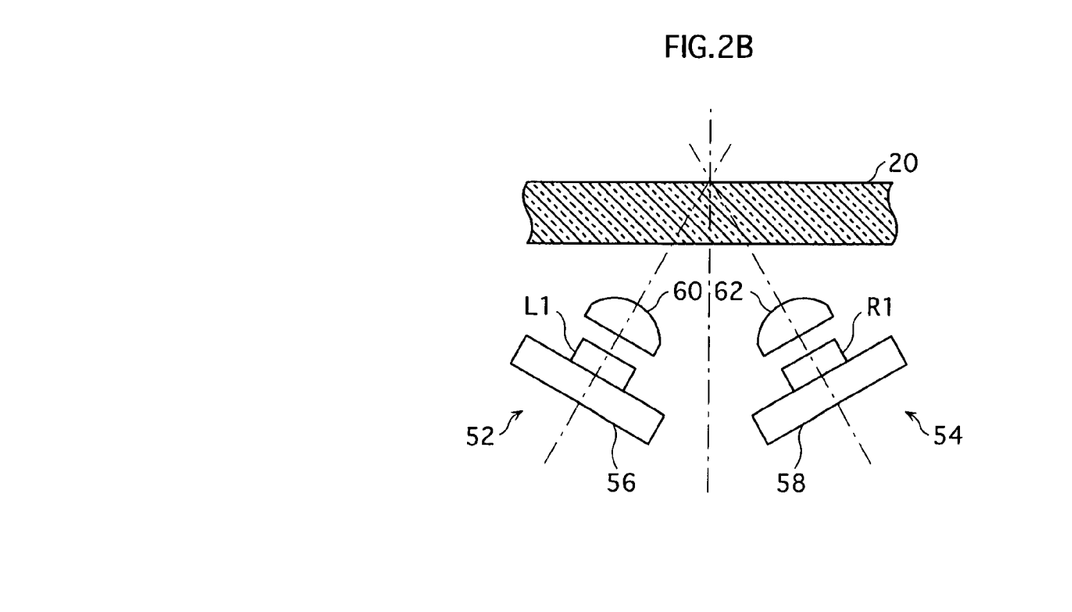
FIG. 2B is a schematic view illustrating a structure of a white light source composed of the LED arrays, seen from a main scanning direction.

As shown in FIGS. 2A and 2B, the white LEDs are mounted on respective substrates 56 and 58. FIG. 2B is a schematic view illustrating a structure of the white light source 40 seen from the main scanning direction. Further, the arrays of white LEDs L1-Ln and R1-Rn are provided with cylindrical lenses 60 and 62, respectively. By passing through the cylindrical lenses 60 and 62, light emitted from the white LEDs converges to the upper surface of the platen glass (i.e. the document surface to be illuminated). When seen from the main scanning direction, as illustrated in FIG. 2B, the LED arrays 52 and 54 are inwardly inclined so that optical axes of the white LEDs cross with each other at a point on the upper surface of the platen glass (i.e. the document surface to be illuminated). Note that the cylindrical lenses 60 and 62 are not illustrated in FIG. 2A. Further, the LEDs of the LED arrays 52 and 54 are in a staggered arrangement in a manner that each LED of the array 52 is offset by half a pitch with respect to a corresponding one of the LEDs of the array 54. With this arrangement, variations of light distribution in the main scanning direction are minimized as much as possible.

Note that the above white LEDs may be any types of LEDs. For example, the white LEDs may be any of the following (1): a combination of a blue LED and a yellow phosphor, (2): a combination of an ultraviolet or violet LED and RGB phosphors, or (3): a combination of blue, green, and red LEDs.

Figure 3A:
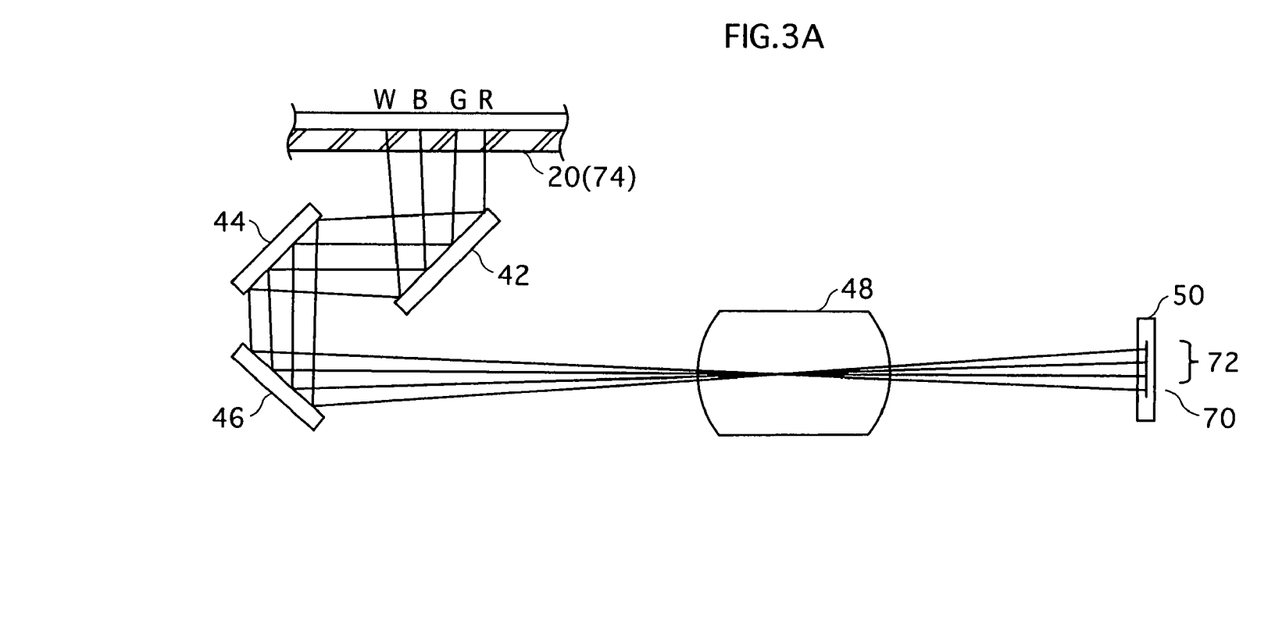
FIG. 3A is a view illustrating a 4-line CCD sensor included in the copier, and an optical system arranged on an optical path of light reflected from a document.

The CCD sensor 50 is a reduced type, 4-line CCD sensor that is composed of three CCD-line sensors 64, 66, and 68 for color reading and one CCD-line sensor 70 for monochrome reading. The CCD-line sensor 64 reads R (Red) components of light reflected from a document surface, and the CCD-line sensor 66 reads G (Green) components, and the CCD-line sensor 68 reads B (Blue) components. Hereinafter, the three CCD-line sensors 64, 66, and 68 may be collectively referred to as a color CCD-line sensor 72. In FIG. 3A, the white light source 40 is not illustrated. The monochrome CCD-line sensor 70 and the color CCD-line sensor 72 are driven one at a time as described below.

Referring back to FIG. 1, in addition to the sheet-through platen glass 20, there is provided, facing the auto-document feeder 16, another platen glass 74 for manually placing a document thereon.

As described above, when reading documents in the sheet-through scheme, the scanner 38 moves to a position shown in FIG. 1 with broken lines (home position). The scanner 38 stays at the home position while illuminating the documents fed one by one by the auto-document feeder 16. In this way, the scanner 38 reads the documents.

On the other hand, the scanner 38 may read a document that is manually placed flat over the platen glass 74. In this case, the auto-document feeder 16 is lifted upward for manually placing a document over the platen glass 74. The scanner 38 moves in the direction of the arrow A shown in FIG. 1. Concurrently, the second mirror 44 and the third mirror 46, operating as a pair, move in the same direction as the scanner 38 at half a speed of the scanner 38. With this arrangement, the distance between the document surface and the collective lens 48 (the optical path length) is kept constant at all times. As a result, it is ensured that light reflected from the document surface comes into a focus on respective photo-receiving surfaces of the monochrome CCD-line sensor 70 and the color CCD-line sensor 72. Note that the scanner 38, the second mirror 44, and the third mirror 46 are driven by a scan motor M2 via a non-illustrated power transmission mechanism. The moving speeds of the scanner and motors are adjustable by changing the rotation speed of the scan motor M2.

The light reflected from the document is photoelectric converted into image signals by one of the CCD-line sensors that is driven, followed by A/D conversion into multi-level digital data by an image processing unit 148, which will be described later. The resulting digital data (hereinafter referred to as "image data") is further subjected to processing, such as shading correction, density conversion, and edge enhancement, by the image processing unit 148, and then stored to an image memory 144 (see FIG. 5), which also will be described later.

Image data stored in the image memory 144 is read by a CPU 138 included in a main control unit 136, which will be described later, and then inputted to a laser control unit 76 included in the printer unit 14. The laser control unit 76 generates laser diode drive signals based on the image data, thereby causing a laser diode 78 to emit light. Laser light emitted by the laser diode 78 is deflected by a polygonal mirror 80 to pass through an fθ lens 82, and then changed its optical path by mirrors 84 and 86 to exposure scan a surface (photosensitive surface) of a photoconductive drum 88 that rotates in the direction of the arrow B.

The photoconductive drum 88 is surrounded by an eraser lamp 90, an electrostatic charger 92, a transfer charger 102, and toner developers 94, 96, 98, and 100 for cyan, magenta, yellow, and black, respectively. Prior to the exposure scan, the photoconductive drum 88 is illuminated with light emitted by the eraser lamp 90, thereby being neutralized. Thereafter, the photoconductive drum 88 is uniformly charged by the electrostatic charger 92. When the uniformly charged photosensitive surface is exposed to light, an electrostatic latent image is formed thereon. The electrostatic latent image is developed as a toner image by one of the above toner developers.

A recording sheet of a desired size is fed from one of paper feed cassettes 104, 106, and 108. By the action of an electrostatic-attraction charger 110, the fed recording sheet wraps around (sticks to) a transfer drum 112. The transfer drum 112 rotates in the direction of the arrow C, thereby transporting the sheet past a position close to the transfer charger 102. As a result, the toner image formed on the photosensitive drum 88 is transferred to the recording sheet.

The above processes from light exposure to image transfer are repeated on the same recording sheet for each color of cyan, magenta, yellow, and black, so that toner images of the respective colors are overlaid to reproduce a color image.

By the action of a neutralization/separation charger 114, the recording sheet onto which four color toner images have been transferred is neutralized to weaken the attraction to the transfer drum 112, so that the sheet is separated from the surface of the transfer drum 112. A fixing unit 116 then fixes the developed image onto the sheet, and the sheet is ejected onto a tray 118.

Note that in the case of reproducing a black and white image (monochrome copying), the above processes from light exposure to image transfer are performed only once for black.

Figure 5:
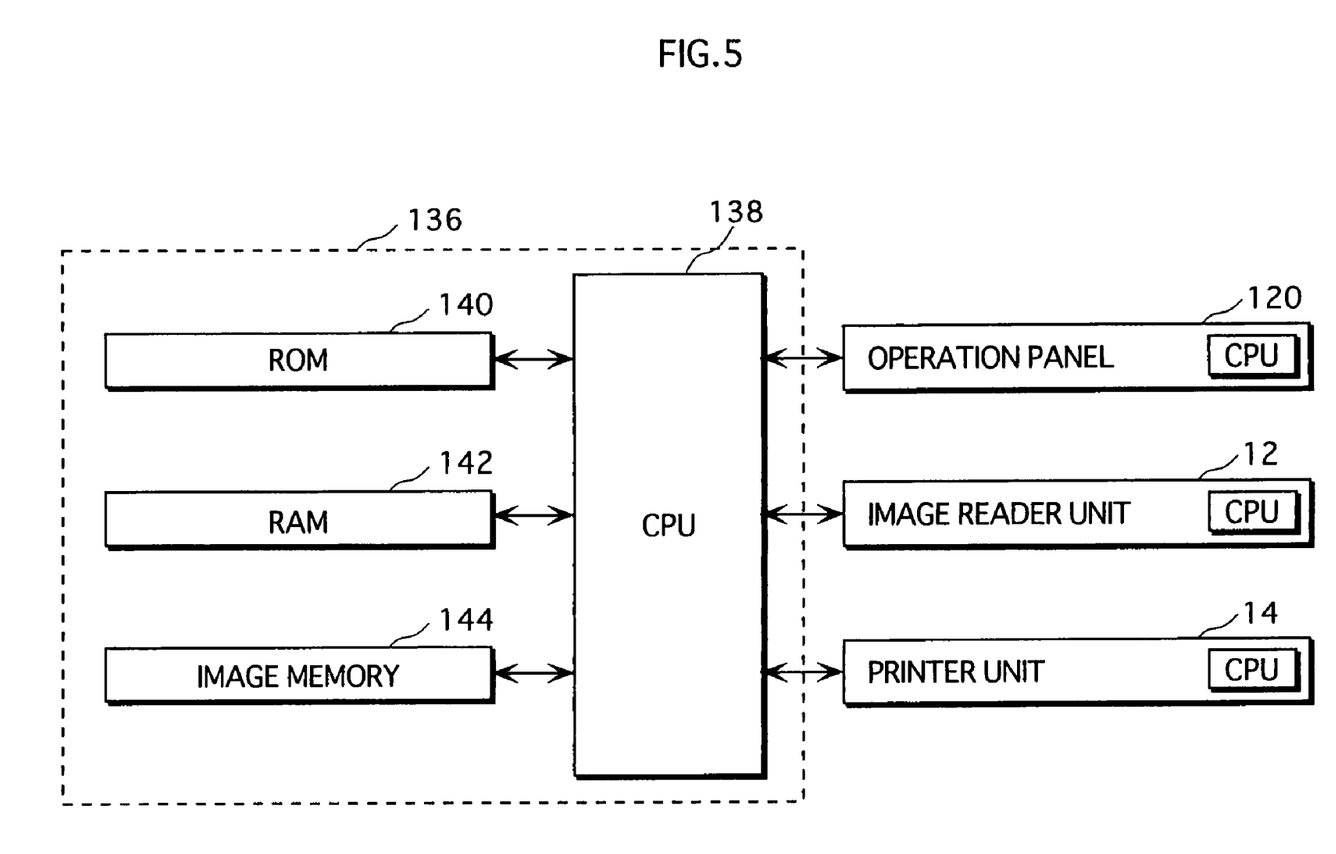
FIG. 5 is a block diagram schematically illustrating a structure of a main control unit of the copier.

The above imager reader unit 12 and the printer unit 14 have individual CPUs (see FIG. 5). The series of copying operations are realized by the CPUs.

Figure 4:
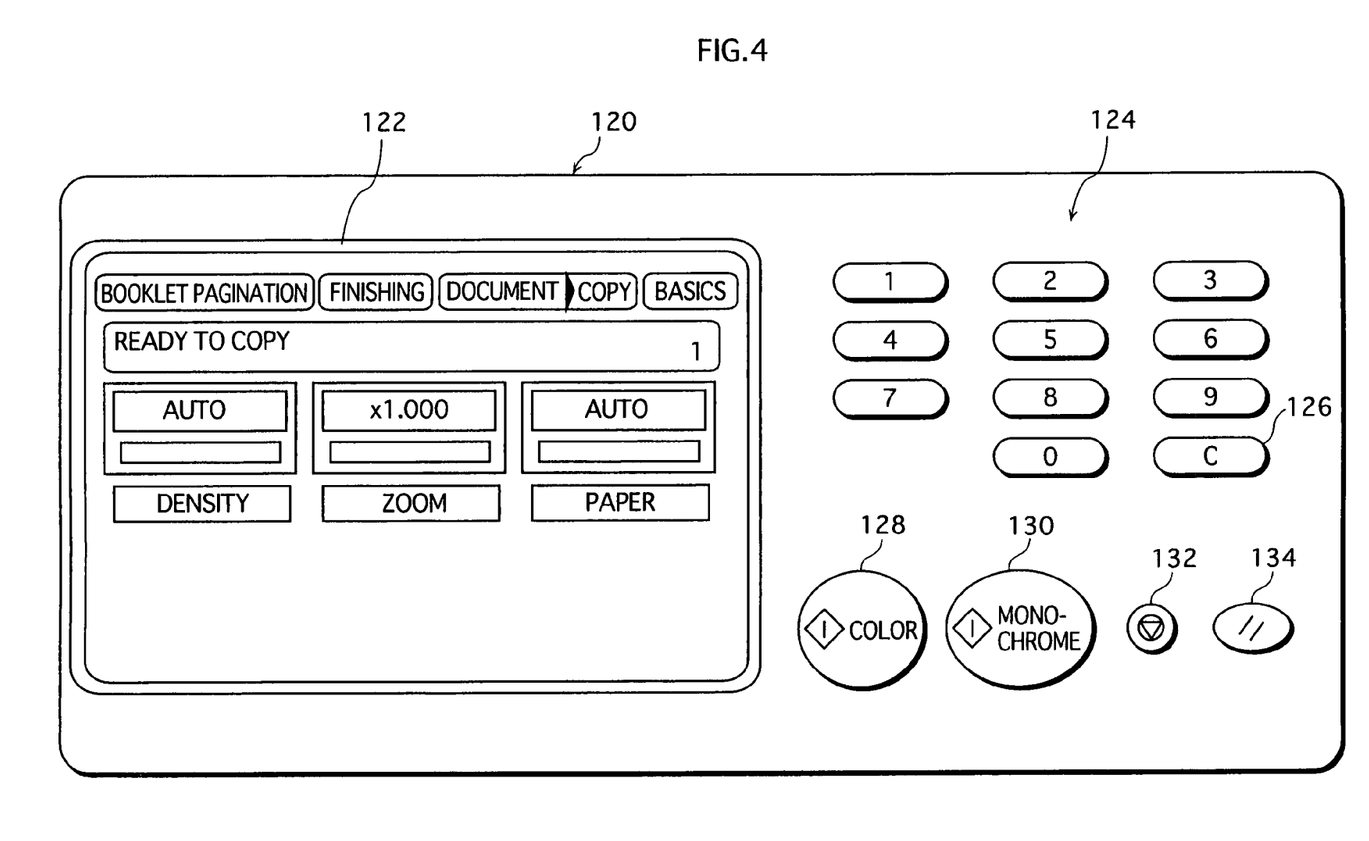

The copier 10 is further provided with an operation panel 120 as shown in FIG. 4. The operation panel 120 is suitably arranged at an upper part of the copier for easy operation.

As shown in FIG. 4, the operation panel 120 has a liquid crystal touch panel 122 as well as various keys. The liquid crystal touch panel 122 displays copy conditions being set, and keys for selecting a copy mode. The liquid crystal touch panel 122 also displays messages indicating paper-out, paper jam, and so on. A ten-key pad 124 is numeric keys for setting a number of copies to be made. A clear key 126 is for resetting the set number of copies to "1". A color-copy start key 128 is for starting a color copy operation (an operation for reading a document image in color and printing the read image in color), whereas a monochrome-copy start key 130 is for starting a monochrome copy operation (an operation for reading a document image in monochrome and printing the read image in monochrome).

A stop key 132 is for stopping a copy operation being performed. A panel reset key 134 is for resting the settings, such as the image density and the zoom ratio, all to its default values or initial settings.

Note that the operation panel 120 also has an individual CPU (see FIG. 5) that controls displays on the liquid crystal touch panel 122 and detects pressing of the keys.

FIG. 5 is a block diagram schematically illustrating a structure of the main control unit 136 of the copier 10.

As illustrated in the figure, the main control unit 136 is composed of the CPU 138 along with a ROM 140, a RAM 142, and the image memory 144 that are connected to the CPU 138. The CPU 138 is also connected to the CPUs of the image reader unit 12, the printer unit 14, and the operation panel 120 described above.

The ROM 140 stores control programs run by the CPUs.

The RAM 142 stores copy conditions set via the operation panel 120, such as the number of copies, copy density, and copy mode.

As mentioned above, the image memory 144 temporarily stores image data outputted from the image reader unit 12.

The CPU 138 comprehensively controls the operation panel 120, the imager reader unit 12, and the printer unit 14 to realize smooth copying operations.

Figure 6:
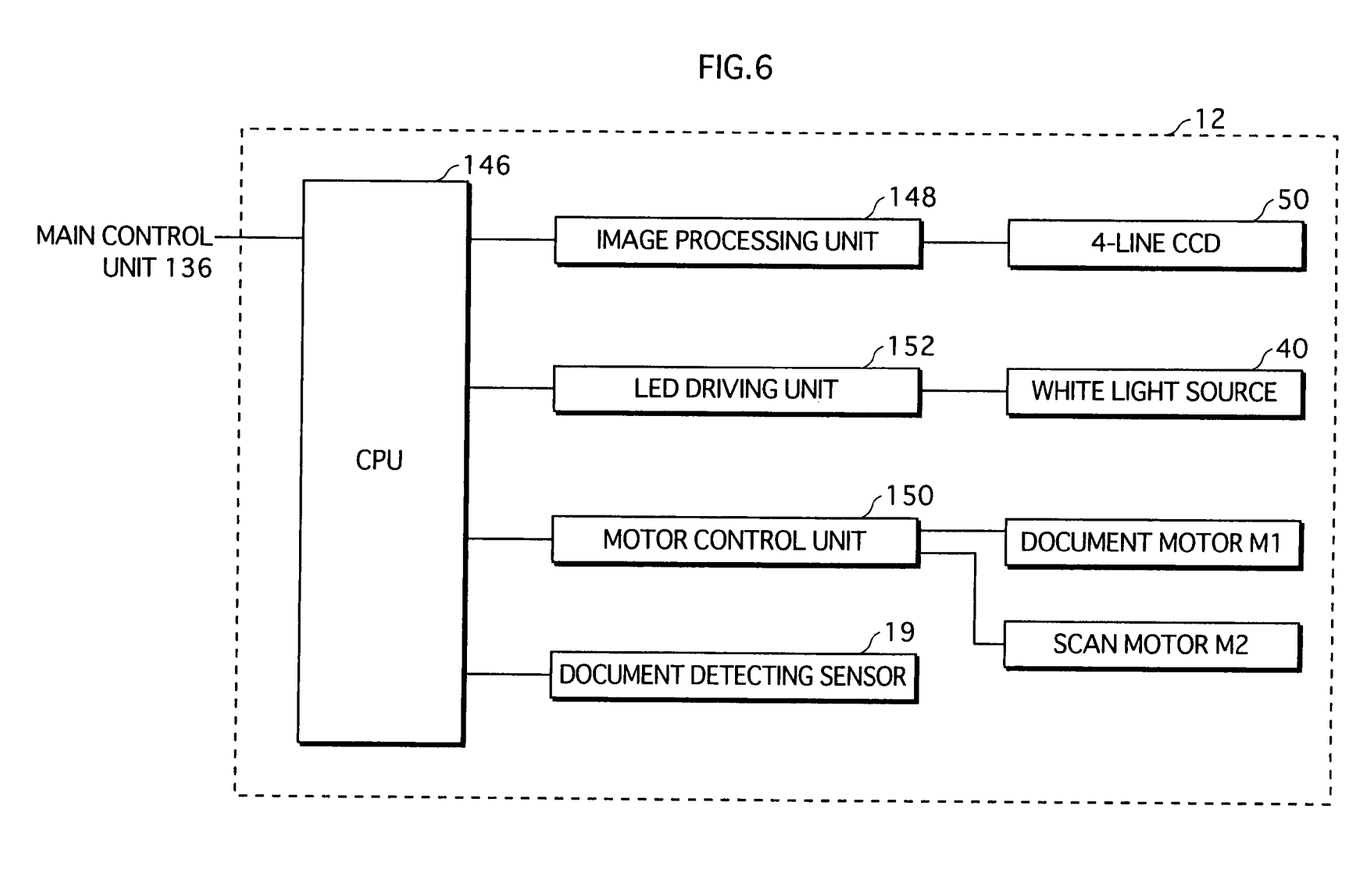
FIG. 6 is a block diagram schematically illustrating a structure of an image reader unit of the copier.

FIG. 6 is a block diagram schematically illustrating a structure of the image reader unit 12.

As shown in FIG. 6, the image reader unit 12 includes the above-described 4-line CCD sensor 50, white light source (LED arrays) 40, document motor M1, scan motor M2, and document detecting sensor 19, and also includes a CPU 146, the image processing unit 148, a motor control unit 150, and an LED driving unit 152.

Under instructions from the main control unit 136 (see FIG. 5), the CPU 146 comprehensively controls the image processing unit 148, the motor control unit 150, and the LED driving unit 152 to carry out reading operations according to received instructions. Examples of the instruction include a color-reading instruction to start reading a document image in color, and a monochrome-reading instruction to start reading a document image in monochrome.

On receiving a color-reading instruction or monochrome reading instruction from the main control unit 136, the CPU 146 informs the image processing unit 148, the motor control unit 150, and the LED driving unit 152 of the received instruction. Hereinafter, a reading operation performed in response to a color-reading instruction is refereed to as a "color mode", whereas a reading operation performed in response to a monochrome-reading instruction is referred to as a "monochrome mode". Further, on receiving either of the read instructions, the CPU 146 refers to the document detecting sensor 19 to see whether the presence of a document is detected. The CPU 146 then instructs the related units to perform reading in the sheet-through scheme when a document is detected, and in the mirror-moving scheme when no document is detected. Here, a reading operation performed in the sheet-through scheme is referred to as a "sheet-through mode", where as a reading operation in the mirror-moving scheme is referred to as a "mirror-moving mode".

Figure 3B:
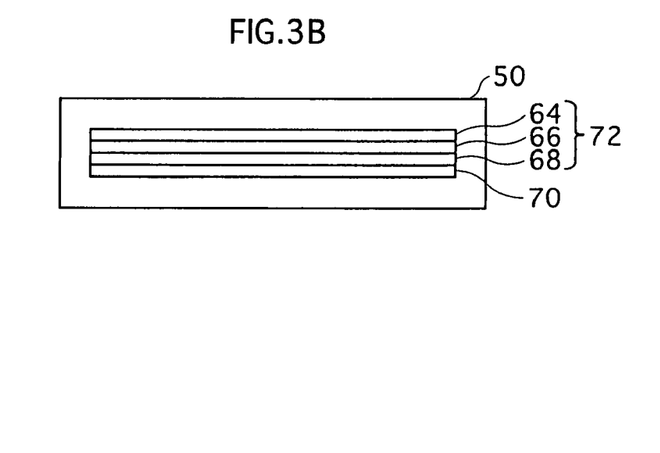
FIG. 3B is a view illustrating the 4-line CCD sensor seen from a receiving surface.

In the color mode, the image processing unit 148 reads an image of a document by driving the color CCD-line sensor 72 (FIGS. 3A and 3B) of the 4-line CCD sensor 50.

On the other hand, in the monochrome mode, the image processing unit 148 reads an image of a document by driving the monochrome CCD-line sensor 64 (FIGS. 3A and 3B) of the 4-line CCD sensor 50.

The motor control unit 150 drives a different motor between the sheet-through mode and the mirror-moving mode. To be more specific, the motor control unit 150 drives the document motor M1 in the sheet-through mode and the scan motor M2 in the mirror-moving mode.

Further, the motor control unit 150 varies the rotation speed of the motor according to which of the color mode and the monochrome mode is selected. Here, the moving speed of the scanner 38 (the white light source 40) relatively to the document is referred to as the "sub-scanning speed".

In the monochrome mode, the motor control unit 150 drives the document motor M1 at the rotation speed V1 or the scan motor M2 at the rotation speed V2. The rotation speeds both result in the sub-scanning speed of 150 [mm/sec]. (See FIG. 7)

Figure 7:
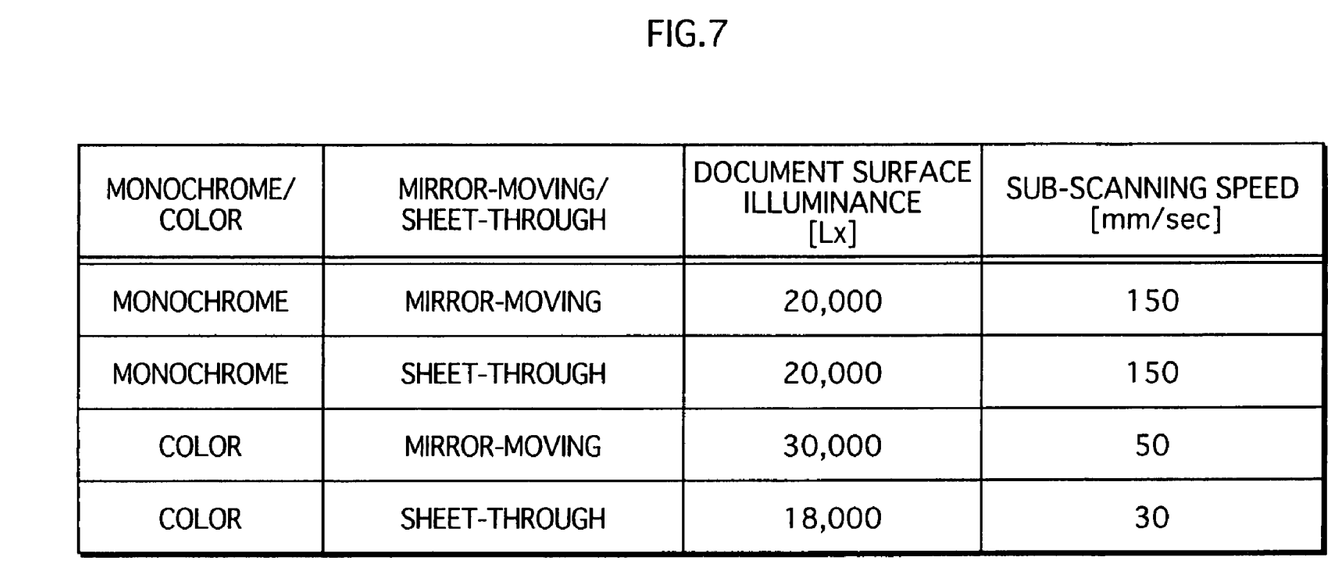
FIG. 7 is a table showing, in relation to each mode, a document surface illuminance and a sub-scanning speed.

In the color mode and simultaneously in the mirror-moving mode, the motor control unit 150 drives the scan motor M2 at the rotation speed V20 {=(V2)/3}, which results in the sub-scanning speed of 50 [mm/sec]. This is to read an image of a document in color with the color CCD-line sensor 72 at the same resolution with an image of a document read in monochrome with the monochrome CCD-line sensor 70.

In the color mode and simultaneously in the sheet-through mode, the motor control unit 150 drives the document motor M1 at the rotation speed V10 {<V1} in order to further reduce the sub-scanning speed from 50 [mm/sec] to 30 [mm/sec]. This is to stabilize the sub-scanning speed, i.e. the transport speed of a document fed by the auto-document feeder 16 in order to reduce deviation from the proper color registration. During the document feed by the auto-document feeder 16, the leading edge of a document sequentially slides between the pairs of rollers after momentary abutting against each respective pair of rollers, and the rear edge of the document is released from the respective roller pairs. As a result, the transport speed is not kept constant throughout the document transport, which inevitably results in color registration problems in a reproduced image. The undesirable variations in the document transport speed can be made smaller by lowering the transport speed. Thus, it is possible to improve the color registration problems to a negligible level.

The LED driving unit 152 controls the intensity of current supplied to the LED arrays 52 and 54 (hereinafter, referred to as the "drive current intensity") according to the modes selected. As a result, the intensity of light emission varies and thus the illuminance on the surface of the document varies as well (hereinafter, referred to as the "document surface illuminance").

The LED driving unit 152 sets the drive current intensity to Q1 which results in the document surface illuminance of 20,000 [lx], commonly in the mirror-moving mode and the sheet-through mode as long as the image reading operation is to be performed in the monochrome mode.

When the image reading operation is to be performed in the color mode and simultaneously in the mirror-moving mode, the LED driving unit 152 sets the drive current intensity to Q3 which results in the document surface illuminance of 30,000 [lx]. The document surface illuminance is set higher than in the monochrome mode (mirror-moving mode) due to the following reason. Generally speaking, the color CCD-line sensor 72 is lower in sensitivity than the monochrome CCD-line sensor 70. Consequently, when reading an image in the color mode with the same document surface illuminance as in the monochrome mode, the resulting S/N ratio is inevitably lower. For this reason, the document surface illuminance is increased to achieve the same level of the S/N ratio as that achieved in the monochrome mode.

When the image reading operation is to be performed in the color mode and simultaneously in the sheet-through mode, the LED driving unit 152 sets the drive current intensity to Q2, which results in the document surface illuminance of 18,000 [lx]. The document surface illuminance is set lower than in the mirror-moving mode due to the following reason. As described earlier, the sub-scanning speed is set lower in the sheet-through mode than in the mirror-moving mode. Owing to the lower sub-scanning speed, when an image of a document is read in the sheet-through mode with the same document surface illuminance as in the mirror-moving mode, an excessive amount of reflected light enters the CCD sensor, thereby saturating output of the CCD sensor. To avoid saturation of the CCD sensor, the document surface illuminance is decreased to an extent suitable for the lower sub-scanning speed. Alternatively, the white light source 40 may be set to emit light at the intensity suitable for the sheet-through mode in both the sheet-through mode and the mirror-moving mode. Yet, this arrangement inevitably degrades the S/N ratio in the mirror-moving mode. Therefore, according to the present embodiment, when reading is performed in the color mode, the white light source 40 is set to emit light at a different intensity between the sheet-through mode and the mirror-moving mode for achieving the same level of S/N ratio in both the sheet-through mode and the mirror-moving mode.

Figure 8:
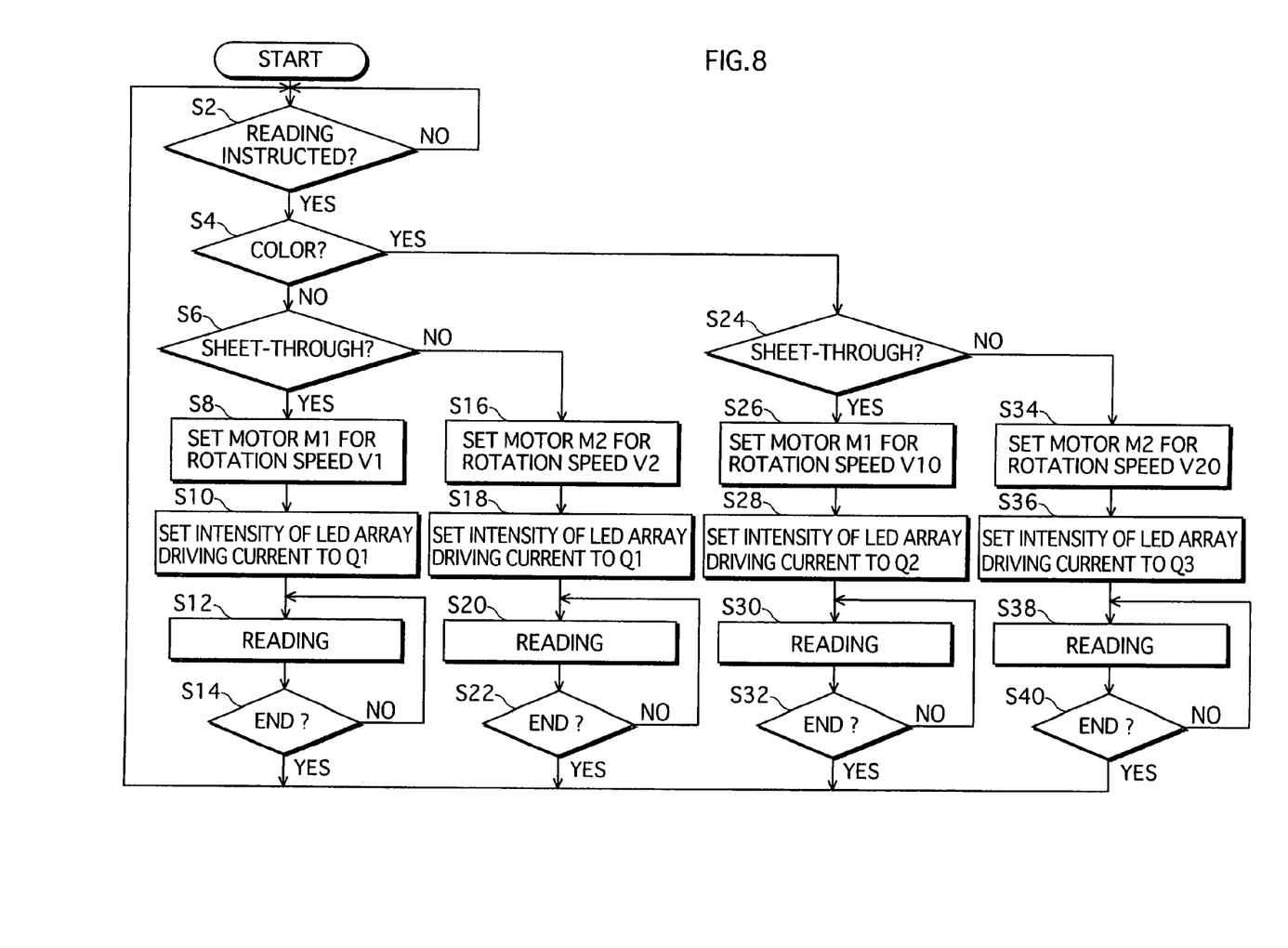
FIG. 8 is a flowchart showing controls performed by the image reader unit.

FIG. 8 is a flowchart showing controls performed by the image reader unit 12.

First, on receiving a read start instruction from the main control unit 136 (step S2, YES), the subsequent processing is branched depending on whether the received instruction is a monochrome reading instruction (step S4, NO) or a color reading instruction (step S4, YES).

In the case of receiving a monochrome reading instruction, the processing moves onto a step S6. In the step S6, the image reader unit 12 judges whether to select the sheet-through mode (step S6, YES) or the mirror-moving mode (step S6, NO), according to the detection of the document detecting sensor 19.

When the sheet-through mode is selected, the image reader unit 12 sets the document motor M1 to rotate at the rotation speed V1 (step S8). In addition, the image reader unit 12 sets the drive current intensity to Q1 (step S10), and then performs the reading operation (step S12). Upon completion of the reading operation (step S14, YES), the processing returns to the step S2.

On the other hand, when the mirror-moving mode is selected, the scan motor M2 is set to rotate at the rotation speed V2 (step S16), and the drive current intensity is set to Q1 (step S18). Then, the reading operation is performed (step S20). Upon completion of the reading operation (step S22, YES), the processing returns to the step S2.

In the case where the received instruction is a color reading instruction, the processing moves onto a step S24. In the step S24, the image reader unit 12 judges whether to select the sheet-through mode (step S24, YES) or the mirror-moving mode (step S24, NO), according to detection of the document detecting sensor 19.

When the sheet-through mode is selected, the document motor M1 is set to rotate at the rotation speed V10 (step S26), and the drive current intensity is set to Q2 (step S28). Then, the reading operation is performed (step S30). Upon completion of the reading operation (step S32, YES), the processing returns to the step S2.

On the other hand, when the mirror-moving mode is selected, the scan motor M2 is set to rotate at the rotation speed V20 (step S34), and the drive current intensity is set to Q3 (step S36). Then, the reading operation is performed (step S38). Upon completion of the reading operation (step S40, YES), the processing returns to the step S2.

It is naturally appreciated that the present invention is not limited to the specific embodiment described above, and following modifications may be made.

In the above embodiment, the intensity of light emission from the white light source (LED arrays) is varied by supplying the drive current at a different intensity. Yet, the light emission intensity maybe varied by changing the number of LEDs turned on.

Figure 9A:
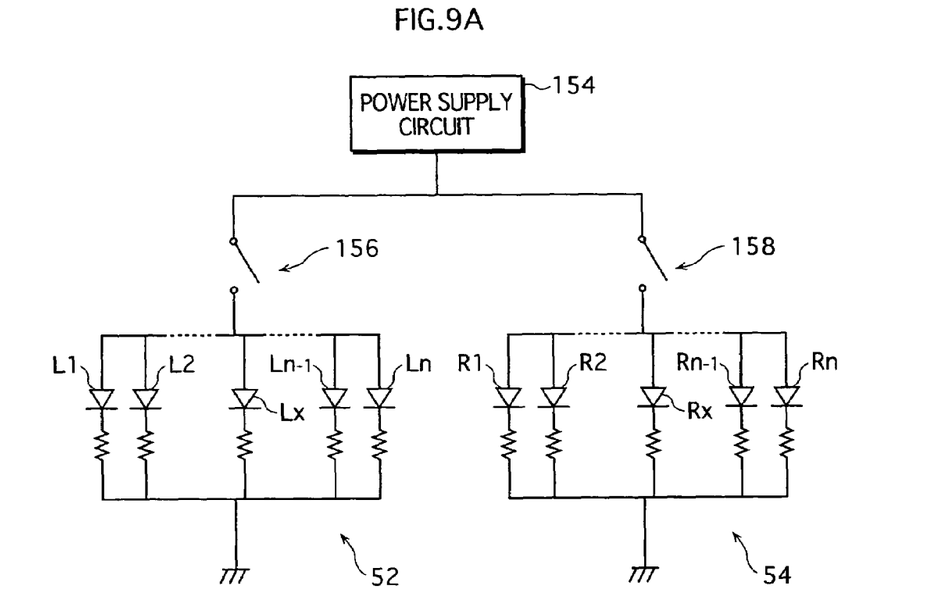
FIG. 9A is a schematic view illustrating a structure of a driving circuit for the LED arrays.
Figure 9B:
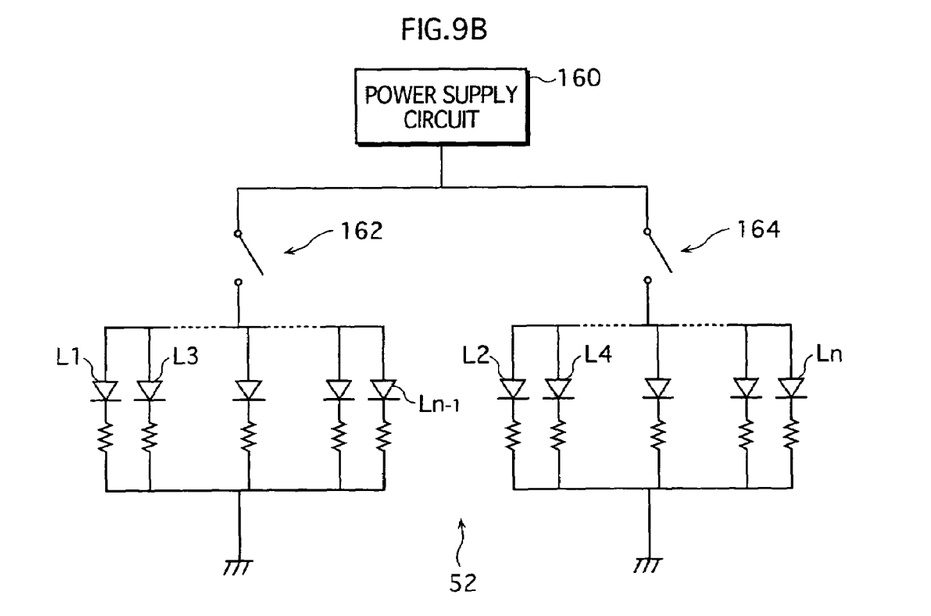
FIG. 9B is a schematic view illustrating another structure of a driving circuit for the LED arrays.

FIGS. 9A and 9B are schematic views illustrating the structures of a driving circuit for the LED arrays according to the above modification.

As described earlier, the LED array 52 is composed of white LEDs L1, L2, . . . and Ln-1, and Ln, whereas the LED array 54 is composed of R1, R2, . . . and Rn-1, and Rn. In the example shown in FIG. 9A, the LED arrays 52 and 54 are connected to a power supply circuit 154 separately via switching elements 156 and 158, respectively.

In the example shown in FIG. 9B, out of all the white LEDs constituting the LED array 52, odd-numbered LEDs (L1, L3, . . . and Ln-1) in the alignment order are connected to a power supply circuit 160 via a switching element 162, whereas even-numbered LEDs (L2, L4, . . . , and Ln) are connected to the power supply circuit 160 via a switching element 164.

With the both structures above, the number of LEDs turned on differs depending on whether only one or both of the switching elements are switched on. As a result, the white light source (the LED arrays) emits light at a different intensity. Note that the switching element may be a mechanically structured one or an electrically or electronically structured one.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image reading method for reading a document to obtain an image thereof by illuminating the document with a light source to receive light reflected from the document, comprising:

a reading mode selecting step of selecting a mode of reading the document from a first mode and a second mode; and a reading step of reading the document by causing the light source to emit light at a first intensity when the first mode is selected and at a second intensity when the second mode is selected;

wherein the first mode is an operation for reading the document in monochrome, and the second mode is an operation for reading the document in color;

in the reading step, the document is moved so that an entire surface of the document is illuminated by the light source that stays in place, a moving speed of the document is higher in the first mode than in the second mode, and the first intensity is higher than the second intensity.

2. The image reading method according to claim 1, wherein the light reflected from the document is received with a CCD sensor, and the CCD sensor includes a single-line CCD sensor adapted to read the document in monochrome and a three-line CCD sensor adapted to read the document in color.

3. An image reading method for reading a document to obtain an image thereof by illuminating the document with a light source to receive light reflected from the document, comprising:

a reading mode selecting step of selecting a mode of reading the document from a first mode and a second mode; and a reading step of reading the document by causing the light source to emit light at a first intensity when the first mode is selected and at a second intensity when the second mode is selected;

wherein the first mode is an operation for reading the document by moving the light source with respect to the document that stays in place, the second mode is an operation for reading the document by moving the document with respect to the light source that stays in place, a speed of the relative movement between the light source and the document is higher in the first mode than in the second mode, the first intensity is higher than the second intensity, and both the first and second reading modes are operations for reading the document in color.

4. An image reading apparatus for reading an image of a document in a selected one of a first mode and a second mode, comprising:

a light source adapted to illuminate a surface of the document;

a CCD sensor adapted to receive light reflected from the document surface; and a light intensity controller adapted to control the light source to emit light at a different intensity between the first and second modes;

wherein the first mode is an operation for reading the document in monochrome, and the second mode is an operation for reading the document in color;

in both the first and second modes, the document is read by moving the document with respect to the light source that stays in place, a moving speed of the document is higher in the first mode than in the second mode, and the light intensity controller controls the light source to emit light at a higher intensity in the first mode than in the second mode.

5. The image reading apparatus according to claim 4, wherein the CCD sensor includes a single-line CCD sensor adapted to read the document in monochrome and a three-line CCD sensor adapted to read the document in color.

6. An image reading apparatus for reading an image of a document in a selected one of a first mode and a second mode, comprising:

a light source adapted to illuminate a surface of the document;

a CCD sensor adapted to receive light reflected from the document surface; and a light intensity controller adapted to control the light source to emit light at a different intensity between the first and second modes;

wherein the first mode is an operation for reading the document by moving the light source with respect to the document that stays in place, the second mode is an operation for reading the document by moving the document with respect to the light source that stays in place, a speed of the relative movement between the light source and the document is higher in the first mode than in the second mode, the light intensity controller controls the light source to emit light at a higher intensity in the first mode than in the second mode, and both the first and second reading modes are operations for reading the document in color.

7. The image reading apparatus according to claim 4, wherein the light source is an array of white LEDs.

8. An image forming apparatus comprising:

an image reader adapted to read an image of a document; and a printer adapted to print the read document on a recording sheet, wherein the image reader includes:

a light source adapted to illuminate a surface of the document;

a CCD sensor adapted to receive light reflected from the document surface; and a light intensity controller adapted to control the light source to emit light at a different intensity between a first and second modes;

wherein the first mode is an operation for reading the document in monochrome, and the second mode is an operation for reading the document in color;

in both the first and second modes, the document is read by moving the document with respect to the light source that stays in place, a moving speed of the document is higher in the first mode than in the second mode, and the light intensity controller controls the light source to emit light at a higher intensity in the first mode than in the second mode.

9. The image forming apparatus according to claim 8, wherein the CCD sensor includes a single-line CCD sensor adapted to read the document in monochrome and a three-line CCD sensor adapted to read the document in color.

10. The image forming apparatus according to claim 8, wherein the light source is an array of white LEDs.

11. The image forming apparatus according to claim 10, wherein the light intensity controller controls the light intensity by changing an intensity of a drive current supplied to the white LED array.

12. The image forming apparatus according to claim 10, wherein the light intensity controller controls the light intensity by turning on a different number of the white LEDs.

13. An image forming apparatus comprising:

an image reader adapted to read an image of a document; and a printer adapted to print the read document on a recording sheet, wherein the image reader includes:

a light source adapted to illuminate a surface of the document;

a CCD sensor adapted to receive light reflected from the document surface; and a light intensity controller adapted to control the light source to emit light at a different intensity between a first and second modes;

wherein the first mode is an operation for reading the document by moving the light source with respect to the document that stays in place, the second mode is an operation for reading the document by moving the document with respect to the light source that stays in place, a speed of the relative movement between the light source and the document is higher in the first mode than in the second mode, the light intensity controller controls the light source to emit light at a higher intensity in the first mode than in the second mode; and both the first and second reading modes are operations for reading the document in color.

\* \* \* \* \*